(12) United States Patent
Samuels et al.

(10) Patent No.: US 7,551,620 B1
(45) Date of Patent: Jun. 23, 2009

(54) PROTECTING DATA INTEGRITY IN AN ENHANCED NETWORK CONNECTION

(75) Inventors: Allen R. Samuels, San Jose, CA (US); Paul G. Sutter, San Francisco, CA (US)

(73) Assignee: Orbital Data Corporation, San Mateo, CA (US)

( * ) Notice: Subject to any disclaimer, the term of this patent is extended or adjusted under 35 U.S.C. 154(b) by 917 days.

(21) Appl. No.: 11/014,532

(22) Filed: Dec. 15, 2004

(51) Int. Cl.
*H04L 12/28* (2006.01)
*H04L 12/56* (2006.01)

(52) U.S. Cl. .................................................. 370/394

(58) Field of Classification Search .............. 370/394, 370/236, 349, 348, 329, 231, 278, 352, 412, 370/389, 413, 392, 401, 466, 229, 230, 358, 370/391, 396; 709/232, 230, 237, 238, 228, 709/226, 235, 250, 217; 375/242; 714/248, 714/748
See application file for complete search history.

(56) References Cited

U.S. PATENT DOCUMENTS

| | | | |
|---|---|---|---|
| 5,062,000 A * | 10/1991 | Harris et al. ................ 348/241 |
| 6,452,915 B1 | 9/2002 | Jorgensen |
| 7,308,432 B2 * | 12/2007 | Torii et al. ................... 706/21 |
| 2003/0123481 A1 * | 7/2003 | Neale et al. ................. 370/466 |
| 2005/0013245 A1 * | 1/2005 | Sreemanthula et al. ...... 370/229 |
| 2005/0044242 A1 * | 2/2005 | Stevens et al. .............. 709/228 |
| 2005/0071436 A1 * | 3/2005 | Hsu et al. .................... 709/212 |
| 2005/0074007 A1 * | 4/2005 | Samuels et al. ............. 370/392 |
| 2007/0206621 A1 * | 9/2007 | Plamondon et al. ......... 370/413 |

OTHER PUBLICATIONS

International Preliminary Report on Patentability, PCT/US2004/024655, Feb. 9, 2006, 7 pages.

* cited by examiner

*Primary Examiner*—Wing F Chan
*Assistant Examiner*—Prenell P Jones
(74) *Attorney, Agent, or Firm*—Choate Hall & Stewart, LLP; John D. Lanza; Christopher J. McKenna

(57) ABSTRACT

The integrity of a data stream transmitted over a network is protected by adjusting the sequence number, the port number, or another field of a data packet field, for a number of data packets so that the data packets will be considered either valid or invalid by a downstream receiving device. Data packets that have such a field adjusted can be thought of as being rotated outside of a valid range or window, as defined for a network connection. This field of a rotated data packet can be further adjusted, through de-rotation or re-rotation, for various applications. Downstream devices can thus respond to the data packets depending on the state of the rotation.

36 Claims, 2 Drawing Sheets

PROTECTING DATA INTEGRITY IN AN ENHANCED NETWORK CONNECTION

BACKGROUND

1. Field of the Invention

This invention relates generally to the field of computer networking, and in particular to protecting the integrity of data packets processed by performance-enhancing proxies (PEPs) in a networking environment.

2. Background of the Invention

One of the most widely used computer networking protocols is the Internet Protocol (IP). IP is a connectionless, best-effort, unreliable, routable networking protocol. Applications that require reliable communications typically use the Transmission Control Protocol (TCP) on top of IP. The TCP protocol layer provides flow control, packet loss detection, lost packet retransmission, congestion avoidance, and other features to provide reliable communications over the unreliable IP networking substrate. Used together, these networking protocols are commonly referred to as TCP/IP. Detailed descriptions of TCP and IP are found in RFC 792 and RFC 793.

TCP has a variety of known limitations that impair its performance, both in general and under restricted circumstances. Because of the importance of TCP networking, many approaches have been tried for mitigating, eliminating, or bypassing its limitations. These approaches include the total abandonment of TCP in favor of a new protocol, the use of nonstandard enhancements to TCP over all or part of the network path, and the use of standardized enhancements. But deploying such enhancements, even standardized ones, can be difficult. Much of the equipment currently used on networks is old enough that it does not support some of the most important standardized enhancements, and of course nonstandard ones are generally not supported at all.

In many cases, however, it is possible to give existing "legacy" equipment the benefits of newer technology through the use of a performance enhancing proxy (PEP). PEPs includes devices that manipulate the protocol, data, or both of a data stream in a way that increases performance while concealing these manipulations from the network equipment at the endpoints. For example, compressing the TCP data stream (payload) can reduce the size of the data to one-half or less of its original size, doubling the effective bandwidth. Compression is only appropriate on low bandwidth links, however, since on fast links the CPU burden of compression erases its performance advantages. Because a characteristic of IP networking is that the end nodes are not aware of the network topology or the speed of the various links, compression and decompression should be implemented not by the end nodes but by hardware attached to the slow links themselves (e.g., at the LAN/WAN boundary). This allows the compression feature to be deployed transparently and where it is needed, with no requirement for universal upgrades of end nodes. This is just one example, however, as many types of PEPs and PEP algorithms are known. RFC 3135 includes a detailed discussion of some of the better-known PEPs.

In some circumstances, PEPs can fail in such a way that the flow of packets through the network is not interrupted. This can happen, for example, when the packets flow around a disabled PEP in some way. Moreover, even if the PEP does not actually fail, similar problems can occur because routing changes can cause packets to bypass a PEP.

Existing networks are designed on the presumption that certain kinds of traffic will take place and other kinds will not. Security considerations often lead to the installation of elaborate firewalls to prevent anomalous traffic from being allowed into or out of a site. But to older equipment, new packet behavior may be considered anomalous. For this reason, a new and innovative transport protocol will most likely fail to interoperate with existing network equipment without a great deal of effort spent towards tedious reconfiguration.

Quality of service (QoS) considerations cause similar problems. For example, an organization may decide that all of its mission-critical traffic is done over TCP, and that high-volume UDP traffic (e.g., streaming music) is mostly irrelevant to the company—when it happens at all. This organization may thus give UDP traffic a low priority. If the organization then installs PEPs that attempt to bypass TCP performance limitations through the translation of TCP streams to UDP, performance would likely plummet rather than increase. This is true not only of UDP, but likely of any protocol not currently in wide use at the organization. Furthermore, the gateways on the interior of the wide-area network, controlled by service providers rather than the organization itself, may be tuned similarly.

Accordingly, the reliable map through the security and QoS minefields involves following in the footsteps of a transport that already passes through the network unscathed. As a rule of thumb, to be confident that data will reach its destination tomorrow is to make the traffic seem indistinguishable from how it operates today. This means using not only the same transport mechanism (e.g., TCP) used by the original application, but also the same host and port numbers.

But traditional methods of enhancing network application encapsulate the original data in a new form, with an entirely new IP header, and often switch away from TCP. This can cause problems with performance and connectivity. Firewalls and QoS software are often the most mysterious and poorly understood elements of a network, and a product that requires significant reconfiguration of them is likely to fail. However, if the original data packets are not encapsulated, the problem remains for the data receiver to distinguish between standard, unmodified packets and those that have passed through a PEP. The results of making such a mistake (e.g., assuming a data packet has been processed by a PEP when it has not, or visa versa) could be catastrophic.

This problem is illustrated for example in the data compression context. In this example, two sites in a network connection have identical PEPs that perform transparent TCP payload compression and decompression, without modifying the host or port numbers. This modified packet stream passes through any set of routers, firewalls, gateways, and QoS units that the original packet stream would. However, if a change were made the network routing and the receiving PEP were bypassed, the ultimate receiver would see a compressed data stream when it expected an uncompressed stream. Importantly, there would be no indication that the data are compressed, leading to data corruption. Similarly, the same problem could occur if the receiving unit failed in some way.

SUMMARY OF THE INVENTION

The integrity of a data stream transmitted over a network is protected by adjusting the sequence number, the port number, or another field of a data packet field, for a number of data packets so that the data packets will be considered either valid or invalid by a downstream receiving device. Data packets that have such a field adjusted can be thought of as being rotated outside of a valid range or window, as defined for a network connection. This field of a rotated data packet can be further adjusted, through de-rotation or re-rotation, for various applications. A rotated data packet can be de-rotated, in which the rotation is removed by restoring the original numbering of the previously adjusted field. A rotated packet may also be re-rotated, in which the field is adjusted so as to not overlap the sequence number space associated with the connection or the space used by any previous rotations. Downstream devices can thus respond to the data packets depending on the state of the rotation.

In one embodiment, the failure of sequence number rotation can be detected and acted upon. For example, a performance enhancing proxy (PEP) adjusts the sequence number of data packets that it processes. If any data packets reach an endpoint unit without having their sequence numbers readjusted back to a valid value (e.g., because they have not undergone appropriate processing by another PEP), the endpoint unit will reject them. In this way, embodiments of the present invention can be used with non-encapsulating PEPs to reduce or eliminate data corruption and with protocol-altering PEPs to reduce or eliminate protocol-induced failures. Sequence number rotation with TCP, as well as with other communication protocols, may be used to achieve a Protected Packet Flow Session (PPFS). In a PPFS, a packet stream is altered in such a way that, while it still recognizably a valid packet stream in the original protocol, if the alteration were to cease, the unmodified stream would be rejected by the end nodes.

DETAILED DESCRIPTION OF THE PREFERRED EMBODIMENTS

Figure 1:
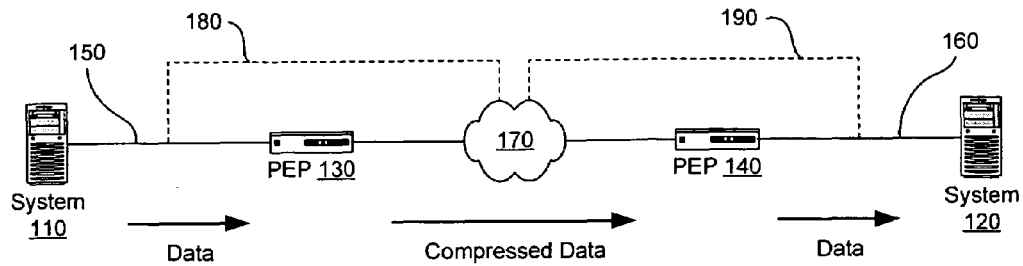
FIG. 1 illustrates a network architecture in which PEPs are used to enhance network communications between two systems, in accordance with an embodiment of the invention.

FIG. 1 is a diagram of a network architecture in which two computer systems 110 and 120 communicate with each other through a corresponding pair of performance enhancing proxies (PEPs) 130 and 140. In the embodiment shown, system 110 is coupled to PEP 130 over a local area network (LAN) 150, and system 120 is coupled to PEP 140 over another LAN 160. PEPs 130 and 150, in turn, communicate over a wide are network (WAN) 170, such as the Internet. In typical configuration, the LANs 150 and 160 are high-speed links, while WAN 70 is a low-speed link. This network architecture is illustrated by example only, as various types of PEPs can be used in various combinations and applications. A thorough discussion of PEPs and their uses in various network configurations is set forth in U.S. application Ser. No. 10/901,952, filed Jul. 28, 2004, which is incorporated by reference in its entirety.

As explained above, PEPs include devices that manipulate the protocol, data, or both of a data stream in a way that enhances the system's performance while preferably concealing these manipulations from the network equipment at the endpoints. Accordingly, PEPs 110 and 140 preferably perform one or more functions to enhance the communication between systems 110 and 120. In one embodiment, PEPs 130 and 140 compress and decompress data flowing between systems 110 and 120. Compressing the data before they are transmitted over the WAN 1170 may improves the maximum achievable data rate between the systems 110 and 120, as the amount of bits that must be transmitted over this low-speed link is thereby reduced. But because this functionality can be invisible to the systems 110 and 120, data integrity problems may arise.

The protocols used in network communications, such as TCP/IP, typically do not control the precise route that data packets traverse to get from one location to another location on a network. For example, data transmitted from system 110 to system 120 may flow through both PEPs 130 and 140, or the data may bypass one or both of PEPs 130 and 140 by flowing through alternate network paths 180 and 190. Bypassing a PEP 130 or 140 is likely to cause data integrity problems so that data arriving at a system 110 or 120 is unusable. For example, if compressed data flowing towards system 120 were to bypass decompression PEP 140 by traveling over alternate path 190, or if PEP 120 were to fail for some reason and not decompress the data, system 120 would receive compressed data when it expected uncompressed data.

To avoid this problem, sequence number rotation is used. Sequence number rotation involves the handling of data or packet serial numbers. In ordinary TCP, this may include both the Sequence Number field and other fields that contain a copy of a sequence number, such as the Acknowledgement (ACK) and Selective Acknowledgement (SACK) fields. In the TCP protocol, each byte of data has an associated sequence number. At the beginning of each TCP connection, the receiver and sender exchange Initial Sequence Numbers (ISNs), which are chosen according to certain rules. For the purposes of this discussion, these rules may be considered arbitrary. With each byte sent, the sequence number is advanced. For example, the first byte in the data stream will have a sequence number equal to the ISN+1, the second byte ISN+2, and so on. Each data packet contains a 32-bit header value that gives the sequence number of the first byte in the payload.

To prevent old or random data from corrupting packet streams, TCP requires that the data receiver discard any data that are outside a current window. This window thus defines valid sequence numbers; if a packet arrives that is outside the current window, it is considered invalid. The receiver discards any invalid packets' data and sends an acknowledgement (ACK) packet to the sender. The arrival of an invalid packet does not affect the receiver's current sequence number or window size, so the corresponding values in the ACK packet are the same as if the invalid packet had never arrived. If the data sender receives an ACK for data that are outside the current window, that ACK is likewise discarded. In this way, packets with sequence numbers outside the current window will not corrupt the data or the ACK stream of a TCP connection. The use of windows in TCP to define acceptable sequence number ranges is described in further detail in RFC 793.

Figure 2:
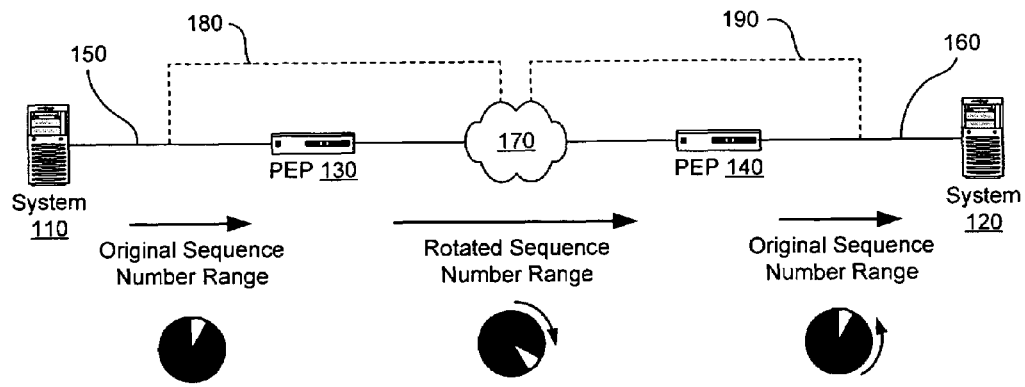
FIG. 2 illustrates the rotation and de-rotation of sequence numbers for data transmitted in the network shown in FIG. 1, according to one embodiment of the invention.

Sequence number rotation makes use of this behavior to protect a TCP connection that has been modified in some way by a PEP. In addition to changing a data stream (e.g., compressing the payload), a PEP that performs sequence number rotation alters a data packet's sequence number to place it outside the current window. FIG. 2 illustrates the network of FIG. 1 in which the PEPs 130 and 140 are equipped to perform sequence number rotation on data that pass therethrough, wherein the value of a data packet's sequence number is adjusted. When adjusted, the sequence number is preferably adjusted wherever the sequence number occurs, including in a SACK. For example, a sender preferably sees an ACK stream that acknowledges the sequence number stream that it defined with the ISN. A receiver preferably sees a stream of sequence numbers that starts at a point chosen by a PEP.

If one considers the possible range of sequence numbers to represent a circle of 360 degrees, the acceptable range for a given network connection is generally some fraction of this range. In TCP, the acceptable range depends on the negotiated window size of the connection, which can be thought of in terms of an angular range (e.g., between 0 and 30 degrees), or a section of the circle. Sequence numbers increase with each byte successfully transferred and wrap around to zero when the range of the sequence number is exceeded. Sequence number rotation occurs when a sequence number is adjusted to be within a new range (i.e., a part of the circle), which preferably does not overlap the range associated with the connection window. Data with rotated sequence numbers can further be de-rotated or re-rotated. In de-rotation, the adjustment of the sequence number is reversed so that the sequence number is restored to its original value. In one embodiment, de-rotation is achieved when the sum of a data packet's sequence number rotation adjustments is a multiple of 360 degrees. In re-rotation, the sequence number is adjusted, in one embodiment, so that not only does it not overlap the sequence number space associated with the connection, but also does not overlap the space used by any previous sequence number rotations.

In one embodiment, the amount by which the sequence numbers are adjusted (i.e., the rotation value) is preferably chosen so that likely failure modes will not accidentally cause the original sequence numbers to reappear. For example, if PEPs are likely to fail in pairs, and the PEPs perform de-rotation, the failure of both PEPs causes the original sequence numbers to appear at the ultimate receiver. This type of failure is undetectable to the receiving system. This is not generally a problem if the enhanced and unenhanced data streams are fully interchangeable, as where the PEPs 130 and 140 merely compress and decompress data for transmission over network 170. But if the enhanced and unenhanced data streams are not interchangeable, the sequence numbers are preferably never returned to their original value if any of the PEPs have failed.

The rotation value chosen may be a constant, with the same value used for all connections, or it may be variable, with different values chosen for different connections. The window size may not be the same for all connections, and the rotation value should be large enough so that the rotated number is outside the current window. The rotation value preferably exceeds this minimum condition by a margin sufficient to prevent delayed data from intruding into the window, since the window's range advances as data is sent or received. Moreover, if a PEP increases the window size, it should use a rotation value appropriate for this larger window.

FIG. 2 illustrates the rotation and de-rotation of sequence numbers for data transmitted in the network shown in FIG. 1, according to one embodiment of the invention. When a data packet passes through upstream PEP 130, the PEP 130 rotates the data packet's sequence number. This rotation is performed in addition to whatever enhancement processing the PEP 130 is designed to perform on the data, and the rotation may be conditional upon whether the enhancement is performed. When a data packet passes through downstream PEP 140, the PEP 140 de-rotates the data packet's sequence number. Again, this de-rotation is performed in addition to the enhancement processing the PEP 140 is designed to perform on the data, and the de-rotation may be conditional upon whether the enhancement is performed. This sequence number rotation and de-rotation are illustrated in FIG. 2 by the rotating circle that shows the range of sequence numbers for the current rotation in white and numbers outside that range in black.

If PEP 140 should fail, data packets with rotated sequence numbers could pass directly to system 120 through alternate path 190. In such a case, system 120 would see only invalid sequence numbers and would not accept the data, thereby preventing data corruption. Even if PEP 140 did not fail, data packets might bypass PEP 140 through path 190 and thus not be processed by PEP 140. In the compression enhancement example, these data would not decompressed and would not be usable by system 120. However, the data would also not have been de-rotated by PEP 140, so system 120 would reject these data packets as outside the current window for the connection. In this way, data corruption caused by a failure of a PEP or by a change in routing is avoided.

If the systems 110 and 120 do not receive any valid data or acknowledgements therefor, the connection would eventually time out. This allows whatever failure condition that caused the time out to be corrected. Beneficially, while the failure condition exists but before the time out, the systems 110 and 120 will not have accepted invalid data and/or acknowledgements. If, instead of altering the payload data, the PEPs implemented protocol options or enhancements that system 120 did not understand, this protection is also provided.

In another embodiment, when two or more PEPs are used along a routing path, the PEPs can be used to detect a failure condition in one another. For example, if one PEP fails or there is a change in routing so that data packets are routed around that PEP, another PEP can notice a deviation from the expected sequence number range of the data packets it receives. For example, in the network of FIG. 2, PEP 140 could detect a failure condition in PEP 130 so that data bypassed it through path 180 by noticing that the data packets' sequence numbers were not being rotated. Similarly, if PEP 140 were to fail so that data bypassed it over path 190, PEP 130 could detect this condition by noticing that the returning ACK stream contains unrotated sequence numbers.

If a PEP detects a failure condition in another PEP, the surviving PEP can detect and possibly diagnose the failure. The surviving PEP may also take action to resolve the error, which might include: logging the occurrence, notifying an administrator, resetting the affected connections, maintaining the affected connections (when possible) by de-rotating or re-rotating the sequence numbers, keeping connections alive until the failed PEP can restart or switch to a redundant spare, or sharing connection data with the restarted or redundant PEP so it can proceed with some or all of the connections that were open at the time of the failure.

Some modes of operation require that two or more PEPs work together. In the compression example, one unit compresses the data and the other decompresses it. Neither task can be left to the standard network stack in the end nodes, since the compression is implemented in a nonstandard, transparent way. When two or more PEPs work together, they must communicate with each other, at least to the extent of verifying each other's existence.

In one embodiment, this is done on a connection-by-connection basis through the use of a characteristic value in the TCP options field. When the connection is initiated by an end node, the first PEP, if it so chooses, adds this characteristic option value to the TCP header of the initial (SYN) packet of the connection. The sequence number of the SYN packet is not rotated. When the SYN packet reaches the endpoint receiver, it will respond with a SYN-ACK packet. The downstream PEP, if present, will add a TCP header to the SYN-ACK packet to indicate its presence to the upstream PEP. Preferably, the downstream PEP does this to only those connections for which it noted the characteristic option value in the SYN packet.

In one embodiment, both PEPs can make enhancement decisions on a per-connection basis, using whatever rules are appropriate to the task they are to perform. In such cases, there may be no need to rotate the sequence numbers of connections that will not be enhanced. For example, a PEP that accelerates only FTP transfers need only rotate sequence numbers of FTP connections, not of connections in general. In this way, unnecessary and wasteful adjustments of sequence numbers are avoided.

In another embodiment, the use of header options allows the PEPs to communicate with each other even if neither PEP knows the IP address of the other. This may be true even if the PEPs do not have IP addresses but operate in "bump-in-the-wire" mode, as if they were a bridge.

Whether the downstream PEP should strip the characteristic value from the SYN packet depends on whether a chain of three or more PEPs becomes a sensible combination. If the downstream PEP strips the characteristic value, PEPs will work in isolated pairs. If the characteristic value is propagated downstream, the PEPs can work either "bucket-brigade" style, with independent enhanced segments between each pair of PEPs, or in a flow-through style where the two end PEPs do all the work and the intermediate ones passively forward the data stream. The preferred choice depends on the problem being solved, and different choices might be made on a connection-by-connection basis. Passive PEPs do not need to perform sequence number rotation.

Because some firewalls reject packets containing nonstandard TCP options, stripping the option from the SYN packet may be the simplest solution. Retaining it may require that the PEP implement a retransmission algorithm to send an option-less SYN packet downstream if the initial attempts to open the connection fail.

In other embodiments, different methods may be used for the PEPs to detect each other's existence. These methods include using the IP options field, sending a separate query to the remote unit to verify its ability to handle the connection, and blindly assuming that it is, in fact, willing to do so.

The degree of rotation presented to the endpoint receiver is preferably maintained for the entire connection. In a single-PEP implementation, this generally means that each enhanced connection uses a rotated sequence number for its entire lifetime, as the rotation value should be chosen at the time the SYN packet is forwarded and retained thereafter.

In a connection with two or more PEPs, the final PEP may de-rotate the sequence numbers of data packets to their original values. In one embodiment, if the packet stream produced by the final PEP is fully equivalent to the original packet stream (as it is after lossless compression and decompression), then it is de-rotated. If traffic happened to be routed around the PEPs and the data arriving through this alternate path were fully equivalent to the data arriving through the PEPs, there would be no reason for the receiver to reject it. The PEPs themselves preferably tolerate such a route-around if they are to perform de-rotation. However, if the packet stream is in some way incompatible with the original, the data should not be de-rotated by the final PEP. Such an incompatibility can occur when the enhanced data stream is not byte-for-byte identical with the original (e.g., when the PEPs perform lossy compression and decompression) because mixing the original and enhanced data streams would lead to data corruption. In short, if the payload of the enhanced connection is not byte-for-byte identical with that of the original connection, de-rotation should not be performed. This is true for the reverse connection (receiver to sender) as well.

In addition, when the control protocols differ between the enhanced and unenhanced data streams, it may also be desirable to avoid de-rotation. The case of a PEP that performs window scaling has already been mentioned. When there is any alteration in the protocol that might cause the receiver to accept data that it should reject or make it likely to fail, de-rotation should not be performed (such as, with window scaling, sending it 64 megabytes when it indicates that it can handle only 64 kilobytes, thus overflowing its receive buffer and possibly causing system failure). Again, this is true for the reverse connection (receiver-to-sender) as well.

De-rotation allows the decision to enhance a connection to be made at any time, not just at connection initiation, if the PEP performing the enhancement and rotation and the PEP performing de-rotation coordinate together. For example, a PEP that can compress only a fixed number of connections might choose to compress the most active connections—a value that may change over time. If the decompressing PEP also performs de-rotation, connections can be added or dropped from the list of enhanced connections in midstream. One advantage of such adding and dropping is that connections that are no longer enhanced could be routed over alternate, unenhanced routes. In such a case, the SYN and SYN-ACK packets have little or no special significance; the characteristic TCP header option could be attached to any packet as long as the transition from an unenhanced, unrotated data stream to an enhanced, de-rotated data stream (and vice versa) were handled smoothly.

Figure 3:
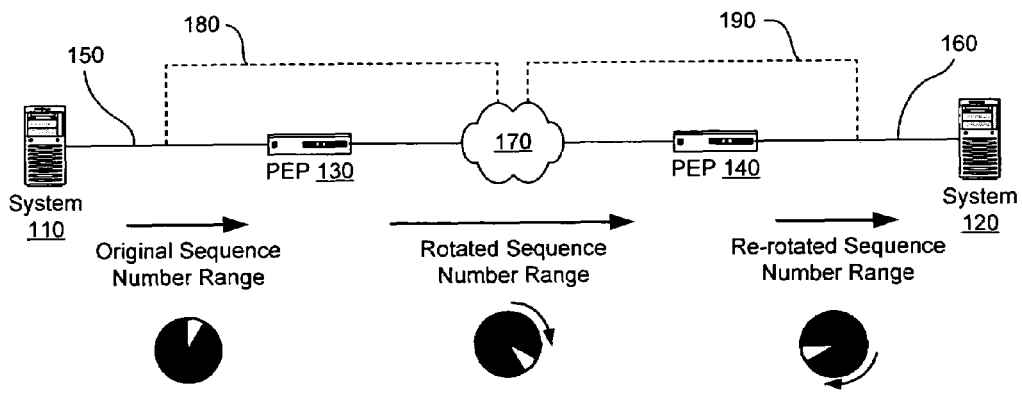
FIG. 3 illustrates the rotation and re-rotation of sequence numbers for data transmitted in the network shown in FIG. 1, according to one embodiment of the invention.

This applies not only to PEPs that perform de-rotation, but also to PEPs that perform re-rotation to new sequence numbers, as shown in FIG. 3. Instead of returning the sequence number to its original value, PEP 140 may adjust the sequence numbers to a new range that is incompatible with both the original range and the rotated range of PEP 130. The endpoint systems 110 and 120 are satisfied as long as the sequence numbers they are presented with are consistent throughout the connection's lifetime; that is, if changes take place only on the interior of the network and are not visible to the endpoint systems 110 and 120.

When the data stream traveling through the PEPs 130 and 140 cannot be intermixed with data traveling over alternate paths 180 and 190, the sequence numbers are not restored to their original values. Instead, they are re-rotated to a range mutually incompatible with both the original data stream from system 110 and the compressed data stream from the PEP 130.

In some configurations, firewalls between the two PEPs 130 and 140 may reject connections that show a change of rotation on behalf of the endpoint systems 110 and 120. This can limit the deployment of variable rotation connections to topologies or in concert with firewalls that do not reject such connections.

Figure 4:
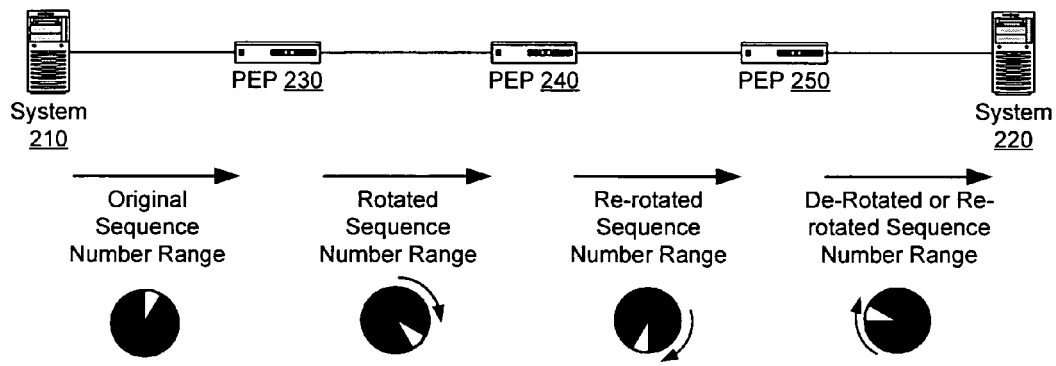
FIG. 4 illustrates a network architecture in which three PEPs are used to enhance network communications, in accordance with an embodiment of the invention.

FIG. 4 illustrates a network architecture in which three PEPs are used to enhance network communications, in accordance with an embodiment of the invention. When three or more PEPs are used in series, the intermediate PEPs 240 may be configured to rotate or re-rotate the sequence numbers as well. This rotation by intermediate PEPs 240 may be excepted if the intermediate PEPs 240 merely pass the data packet through without processing it, leaving the processing to the other PEPs 230 and 250. If the intermediate PEPs 240 do not rotate the sequence numbers, however, their failure may pass undetected.

In one embodiment, the arrival of a data packet with a properly rotated sequence number is sufficient for the downstream PEP 250 to know that an enhanced connection has truly been established. Similarly, the upstream PEP 230 knows that the enhanced connection has truly been established once ACK packets with properly rotated sequence numbers begin to arrive. The connection can be assumed to be healthy as long as the sequence numbers are rotated properly. This does not mean that additional status information is not useful, only that it the data stream itself may provide a useful source of information. Similarly, the arrival of a data packet with an unrotated sequence number (or an incorrectly rotated one) when a rotated number was expected implies a routing failure or the failure of a partner unit.

Figure 5:
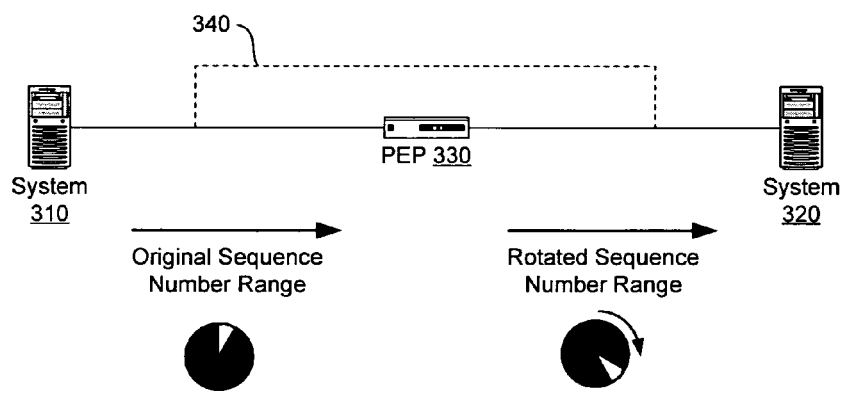
FIG. 5 illustrates a network architecture in which a single PEPs is used to enhance network communications, in accordance with an embodiment of the invention.

FIG. 5 shows an isolated PEP 330, which performs sequence number rotation that is never subsequently adjusted by de-rotation or re-rotation. Some enhancements can be performed by an isolated PEP 330, rather than multiple PEPs working together. Isolated PEPs 330 do not have a second unit to perform de-rotation for them, so the receiver always sees the rotated sequence number on enhanced connections. One example of a single-PEP implementation includes an HTTP proxy that performs transparent image downscaling for higher performance, or language translation to allow speakers of one language to read Web pages written in another. Such operations, unlike the lossless compression examples described earlier, may not be intended to be reversed at the other side of the link. Therefore, a second PEP is not required, nor is de-rotation desirable.

In one embodiment, a purpose of a non-encapsulating PEP is to use packet characteristics that will allow the data stream to be forwarded and accepted when everything is working, but be rejected when things go wrong. Sequence number rotation in a TCP session, as described above, may allow for this. In another implementation, sequence number rotation in a Generic Routing Encapsulation (GRE) data stream can be used. The TCP and GRE embodiments are analogous, although the rules for GRE sequence numbers are not the same as for TCP. In particular, the sequence number field is optional in GRE, so the PEP would add that field if it is not present already. GRE tunnels begin with a sequence number of zero, meaning that de-rotation, or the removal of the sequence number field, would be performed. The GRE sequence number is discussed in RFC 2890.

Sequence number rotation may be useful not only when the payload data is to be altered, but also when transmission features that are not universally deployed are used by the PEPs. For example, a PEP may implement optional features, such as TCP window scaling, on behalf of less-capable systems. Sequence number rotation allows such PEPs to ensure that the less-capable systems would discard data packets that are not usable to them due to the optional features.

In some applications, sequence number rotation may have a side effect when a route-around occurs. The two endpoint systems, seeing traffic that is outside the current windows, exchange ACK packets back and forth until the connection times out. These ACK loops waste network bandwidth, especially when the two end nodes are close enough to each other that the low round-trip time allows packets to "ping-pong" back and forth quickly.

In another embodiment, fields other than the sequence number can be used for the rotation. When a TCP connection is opened, half of the port numbers are fixed and half are, for practical purposes, chosen at random by the endpoint units. These ports can be altered by the PEP to map to other ports. Should a failure of a unit or routing occur, an endpoint unit would see traffic involving ports for which there are no open sessions. This traffic would thus be discarded.

Port rotation has some similarities to network address translation (NAT), though NAT generally changes both an address and a port number, while port rotation generally changes a port number alone. Moreover, port rotation and NAT may serve different purposes, as NAT provides connectivity, while port rotation protects data integrity.

De-rotation of port numbers is desirable because not all connections use ephemeral port numbers. Some types of connections, such as FTP, use meaningful port numbers for both the source and destination. De-rotation is preferably used when possible, rather than discovering and implementing special methods for handling every existing and future protocol that does not use ephemeral ports.

De-rotation of port numbers may make route-arounds undetectable. As with sequence number rotation, it is undesirable when a PEP has permanently modified the data stream, making the version emerging form the final PEP different from the unprocessed version. In such a case, port numbers are preferably not de-rotated. In general, this is not burdensome because these data stream modifications are protocol-specific (e.g., when viruses are removed from email messages), and here protocol-specific port handling is addressed.

Using ports may have drawbacks in some applications compared to using sequence numbers because the possibility of port-number collisions exists if there are route-arounds. Also, when the PEP is first started, it does not have complete knowledge of which ports are in use, increasing the possibility of port-number collisions if de-rotation is not used. However, in circumstances where the PEP is a single point of failure—all network traffic flows through it, and is cut off when the PEP fails—this is generally not a problem. The port alteration provides against software bugs and other partial failures of the PEP. In a more general case, a learning mode may be used to reduce any difficulties associated with this.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. For example, although embodiments of the invention are described in connection with PEPs that perform data compression and decompression, the invention is in no way limited to use with PEPs that provide that functionality. Rather, the sequence number rotation and other data integrity schemes described herein can be applied to PEPs that perform other operations on a data stream.

In another aspect, although some embodiments of the invention are described in connection to rotation of sequence numbers, other fields of a data packet or data stream could be used. For example, rather than adjusting sequence numbers, a field that can be altered without upsetting intervening routers while causing endpoint systems to accept or reject the packets could be adjusted. Appropriate fields may include checksums (e.g., CRCs) for upper-level protocols.

Similarly, while the invention is described in terms of the TCP/IP protocol, the invention could be used with other protocols that use sequence numbers or an equivalent or substitute thereof. It is therefore intended that the scope of the invention be limited not by this detailed description, but rather by the claims appended hereto.

Any of the steps, operations, or processes described herein can be performed or implemented with one or more software modules or hardware modules, alone or in combination with other devices. It should further be understood that any portions of the system described in terms of hardware elements may be implemented with software, and that software elements may be implemented with hardware, such as hard-coded into a dedicated circuit. In one embodiment, a software module is implemented with a computer program product comprising a computer-readable medium containing computer program code, which can be executed by a computer processor for performing any or all of the steps, operations, or processes described herein.

What is claimed is:

1. A method for protecting data integrity for an enhanced network connection, the network connection having a set of values associated therewith that describes data packets for the network connection, the method comprising:

receiving a data packet for a remote device, the data packet having a field that is within the set of values that describes data packets for the network connection;

performing enhancement processing on the data packet;

adjusting the field of the processed data packet so that the field is outside the set of values that describes data packets for the network connection; and transmitting the data packet to the remote device.

2. The method of claim 1, wherein the set of values that describes data packets for the network connection includes a sequence number range, and wherein the field of the data packet specifies a sequence number for the data packet.

3. The method of claim 2, wherein the sequence number of the data packet is adjusted by a value greater than a maximum window size for a TCP session of the network connection.

4. The method of claim 2, further comprising:

receiving an acknowledgement packet for the data packet from the remote device, the acknowledgement packet having a sequence number outside the sequence number range associated with the connection; and adjusting the sequence number of the acknowledgement packet so that the sequence number is within the sequence number range of the connection.

5. The method of claim 1, wherein the set of values that describes data packets for the network connection includes a port number, and wherein the field of the data packet specifies a port number associated with the connection.

6. The method of claim 5, further comprising:

receiving an acknowledgement packet for the data packet from the remote device, the acknowledgement packet having a port number that is not included in the set of values that describes data packets for the network connection; and adjusting the port number of the acknowledgement packet so that the port number is included in the set of values.

7. The method of claim 1, wherein receiving the data packet and transmitting the data packet use the same protocol.

8. The method of claim 1, wherein the network connection is a TCP session.

9. The method of claim 1, wherein the data packet is passed to the remote device without being encapsulated.

10. The method of claim 1, wherein the upstream enhancement processing includes data compression.

11. The method of claim 1, wherein the data packet is part of a Generic Routing Encapsulation data stream.

12. A method for protecting data integrity for an enhanced network connection, the network connection having a set of values associated therewith that describes data packets for the network connection, the method comprising:

receiving a data packet for a remote device, the data packet having a field that is outside the set of values that describes data packets for the network connection;

performing enhancement processing on a data packet;

adjusting the field of the processed data packet so that the field is within the set of values that describes data packets for the network connection; and transmitting the data packet to the remote device.

13. The method of claim 12, wherein the set of values that describes data packets for the network connection includes a sequence number range, and wherein the field of the data packet specifies a sequence number for the data packet.

14. The method of claim 13, further comprising:

receiving an acknowledgement packet for the data packet from the remote device, the acknowledgement packet having a sequence number within the sequence number range associated with the connection; and adjusting the sequence number of the acknowledgement packet so that the sequence number is outside the sequence number range of the connection.

15. The method of claim 12, wherein the set of values that describes data packets for the network connection includes a port number, and wherein the field of the data packet specifies a port number associated with the connection.

16. The method of claim 15, further comprising:

receiving an acknowledgement packet for the data packet from the remote device, the acknowledgement packet having a port number that is included in the set of values that describes data packets for the network connection; and adjusting the port number of the acknowledgement packet so that the port number is not included in the set of values.

17. The method of claim 12, wherein receiving the data packet and transmitting the data packet use the same protocol.

18. The method of claim 12, wherein the network connection is a TCP session.

19. The method of claim 12, wherein the data packet is passed to the remote device without being encapsulated.

20. The method of claim 12, wherein the upstream enhancement processing includes data compression.

21. The method of claim 12, wherein the data packet is part of a Generic Routing Encapsulation data stream.

22. A method for protecting data integrity in a network connection, the method comprising:

passing data packets between two endpoint systems in an upstream direction and a downstream direction, the data packets including a data portion and an information portion;

for each of at least some of the data packets in an upstream direction, performing upstream processing on the data portion of the data packet, and altering the information portion of the data packet so that the data packet is invalid to an endpoint system; and for each of at least some of the data packets in a downstream direction, performing downstream processing on the data portion of the data packet, and altering the information portion of the data packet so that the data packet is valid to an endpoint system.

23. The method of claim 22, wherein passing data packets is performed without encapsulating the data packets.

24. The method of claim 22, wherein the information portion of each data packet includes a sequence number for the data packet.

25. The method of claim 24, wherein a data packet is valid to an endpoint if its sequence number is within a current window, and a data packet is invalid to an endpoint if its sequence number is outside a current window.

26. A system for enhancing a network connection, the system comprising:
    an upstream enhancement device configured to receive data packets from a sender system, each data packet having a field that is within a set of values that describes data packets for the network connection, the upstream enhancement device further configured to perform upstream enhancement processing on the data packets and to adjust a sequence number of each processed data packet to be outside the set of values that describes data packets for the network connection; and
    a downstream enhancement device for receiving the processed data packets from the upstream enhancement device and passing the data packets to a receiver system, the downstream enhancement device configured to perform downstream enhancement processing on the data packets and to adjust the sequence number of each processed data packet to be within the set of values that describes data packets for the network connection.

27. The system of claim 26, wherein the set of values that describes data packets for the network connection includes a sequence number range, and wherein the field of the data packet specifies a sequence number for the data packet.

28. The system of claim 26, wherein the set of values that describes data packets for the network connection includes a port number, and wherein the field of the data packet specifies a port number associated with the connection.

29. The system of claim 26, wherein then downstream enhancement device's adjustment of each data packet's sequence number reverses the upstream enhancement device's adjustment of the sequence number.

30. The system of claim 26, wherein the upstream processing includes data compression and the downstream processing includes data decompression.

31. The system of claim 26, wherein the network connection is a TCP session.

32. The system of claim 26, wherein the data packets are passed from the upstream enhancement device to the downstream enhancement device without being encapsulated.

33. A computer program product for protecting data integrity in a network connection, the computer program product comprising a computer-readable medium storing computer program code for performing a method comprising:
    passing data packets between two endpoint systems in an upstream direction and a downstream direction, the data packets including a data portion and an information portion;
    for each of at least some of the data packets in an upstream direction, performing upstream processing on the data portion of the data packet, and
    altering the information portion of the data packet so that the data packet is invalid to an endpoint system; and
    for each of at least some of the data packets in a downstream direction, performing downstream processing on the data portion of the data packet, and
    altering the information portion of the data packet so that the data packet is valid to an endpoint system.

34. The computer program product of claim 33, wherein passing data packets is performed without encapsulating the data packets.

35. The computer program product of claim 33, wherein the information portion of each data packet includes a sequence number for the data packet.

36. The computer program product of claim 35, wherein a data packet is valid to an endpoint if its sequence number is within a current window, and a data packet is invalid to an endpoint if its sequence number is outside a current window.

* * * * *